United States Patent [19]
Lush

[11] Patent Number: 6,073,582
[45] Date of Patent: Jun. 13, 2000

[54] COLLAPSIBLE FEEDER

[75] Inventor: Raymon W. Lush, Bloomfield, Nebr.

[73] Assignee: Sweet Corn Products LLC, Bloomfield, Nebr.

[21] Appl. No.: 09/379,650

[22] Filed: Aug. 24, 1999

Related U.S. Application Data

[63] Continuation-in-part of application No. 09/033,056, Mar. 2, 1998.

[51] Int. Cl.[7] ............................................ A01K 5/00
[52] U.S. Cl. ............................. 119/51.01; 119/52.3
[58] Field of Search .................. 119/51.01, 52.2, 119/52.3, 57.8, 57.9, 434, 7; 43/7, 9

[56] References Cited

U.S. PATENT DOCUMENTS

| | | |
|---|---|---|
| 3,399,650 | 9/1968 | Goodman . |
| 4,434,745 | 3/1984 | Perkins et al. ............ 119/57.9 |
| 5,203,281 | 4/1993 | Harwich ................... 119/57.9 |
| 5,299,530 | 4/1994 | Mukadam et al. .......... 119/223 |
| 5,755,176 | 5/1998 | Edwards .................. 119/51.01 |
| 5,758,596 | 6/1998 | Loiselle .................... 119/52.2 |
| 5,826,539 | 10/1998 | Bloedorn .................. 119/52.2 |

*Primary Examiner*—Peter M. Poon
*Assistant Examiner*—Yvonne R. Abbott
*Attorney, Agent, or Firm*—Zarley, Mckee, Thomte, Voorhees & Sease; Dennis L. Thomte

[57] ABSTRACT

A collapsible feeder for birds, squirrels and the like is disclosed and comprises a disk-shaped upper support plate having a central feed fill opening formed therein. A cover selectively closes the central feed fill opening. A truncated, conical-shaped collapsible metal mesh wall is secured to the upper support plate and extends downwardly and outwardly therefrom. The lower end of the mesh wall is closed by means of a conical-shaped lower support plate which is perforated. A perch ring is provided at the lower end of the feeder to enable animals to perch thereon. The mesh wall has a plurality of diamond-shaped openings formed therein. The feeder may be selectively collapsed for shipment and storage. An inverted U-shaped hanger bracket is secured to the upper support plate for supporting the feeder in an upright position below a support bracket, tree branch or the like.

18 Claims, 5 Drawing Sheets

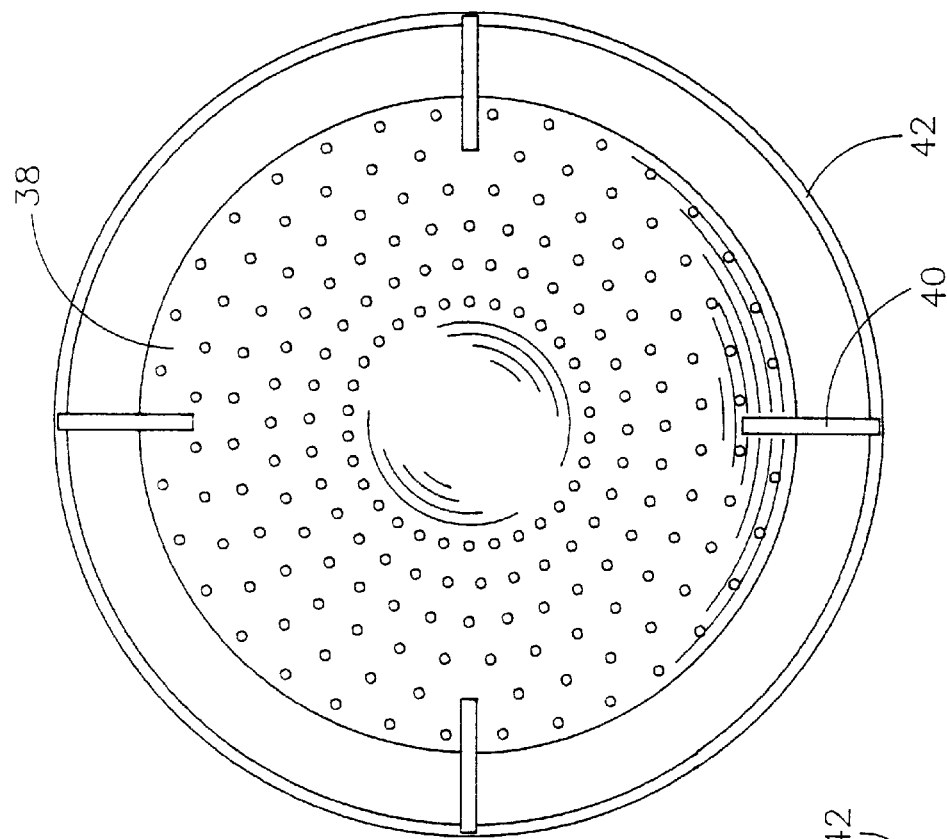
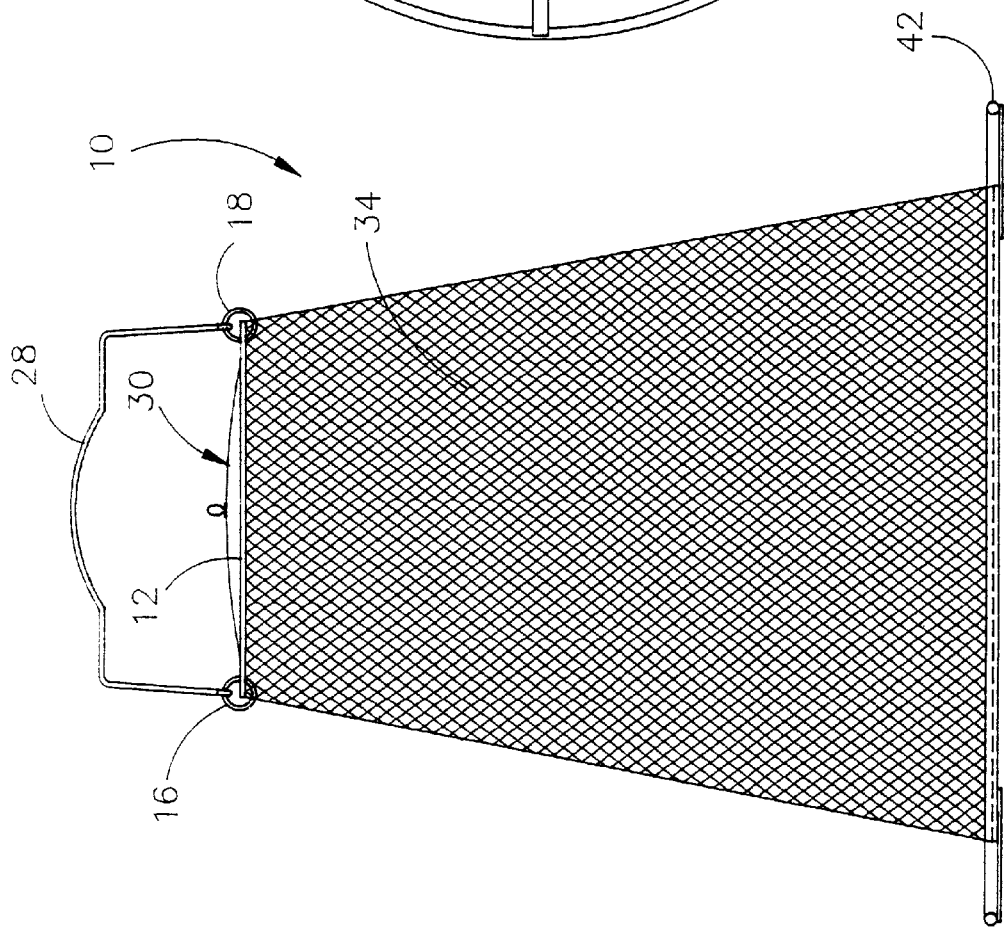

COLLAPSIBLE FEEDER

CROSS-REFERENCE TO RELATED APPLICATION

This is a continuation-in-part application of application Ser. No. 09/033,056 filed Mar. 2, 1998, entitled "Improved Collapsible Wild Game Feeder Apparatus".

BACKGROUND OF THE INVENTION

1. Field of the Invention

This invention relates to a collapsible feeder and more particularly to a collapsible feeder for birds, squirrels and the like which is convenient to install, convenient for wild game to perch upon, and which is resistant to damage from squirrels and other feeding wildlife.

2. Description of the Related Art

Selectively collapsible containers are commonly used to hold seeds, suet and the like as food for wild animals such as birds, squirrels, etc. Many of the collapsible wild game feeders of the prior art are constructed from plastic polymer, natural fiber mesh or netting. Mesh or netting feeders have the advantage of not requiring a rod, dowel or other support for small birds, since the birds can perch on the mesh or net and feed at any exposed location on the feeder. Examples of mesh or net feeders of the prior art including the Thistle Pouch brand feeder manufactured by Havegard Farm, Inc. of Algoma, Wis., and Feather Friends E-Z Feeders brand wild bird feeder marketed by Canine's Choice of Marion, Ind. Other types of collapsible feeders are disclosed in U.S. Pat. Nos. 5,203,281; 4,706,871; and 4,026,025. Another type of collapsible wild game feeder is described in applicant's U.S. Pat. No. 5,479,881. The feeder of the '881 patent consists of a solid, weather-resistant bag fitted with openings at its base to allow attachment of rods for perching and access to the seed or other food contained in the bag.

Although many collapsible wild game feeders of the known art are convenient to install and highly attractive to wild game when they are first placed in use, none of the collapsible feeders of the known art are suitable for the feeding of squirrels or other large, aggressive feeding wildlife such as jays and monk parakeets. Squirrels and other large, aggressive feeding wildlife quickly tear the mesh of collapsible feeders of the known art and create holes through which the food spills from the feeder onto the ground below. Similarly, squirrels and large birds can easily enlarge the feeding openings or simply create new openings in the walls of the feeder of the '881 patent. After squirrels or large birds have damaged the net, webbing or walls of feeders of the known art, the food spills out and is no longer available to attract wildlife to the feeder. Further, the spilled feed creates additional problems by attracting mice and other pests that feed on the ground.

Wire mesh feeders constructed of rigid steel wire are also well-known to those skilled in the art of wild game feeding. The rigid steel wire mesh feeders are frequently used to hold blocks of suet or mixtures of seed, animal fat, peanut butter and the like. Although the rigid wire mesh feeders of the known art are resistant to chewing by squirrels and pecking by aggressive feeding birds, the rigid wire mesh feeders are not selectively collapsible for storage, shipment, etc. When the rigid wire mesh feeders are bent, dented, flattened or crushed, they cannot be expanded and reused without suffering metal fatigue and damage to their attachments, connections and welds.

SUMMARY OF THE INVENTION

A collapsible feeder for birds, squirrels and the like is disclosed and includes a disk-shaped upper support plate having a central feed fill opening formed therein. A conical-shaped cover member is selectively positioned on the support plate for selectively closing the central feed fill opening. A truncated, conical-shaped mesh wall has its upper end secured to the upper support plate and extends downwardly therefrom. A perforated, lower support plate is secured to the collapsible mesh wall and extends across the lower end thereof. A plurality of support rods are secured to the lower support plate and extend outwardly therefrom. A perch ring is secured to the outer ends of the rod. If the perch ring is not supported by the rods, a perch ring can be removably secured to the mesh wall at the lower end thereof.

It is therefore a principal object of the invention to provide a selectively collapsible feeder for wild game.

Yet another object of the invention is to provide a selectively collapsible feeder which is constructed of a metal mesh material.

Still another object of the invention is to provide a selectively collapsible feeder for wild game that is inexpensive and simple to construct, easy to install and use, and is capable of accepting a wide variety of wildlife foods.

Yet another object of the invention is to provide a selectively collapsible feeder which occupies a minimum of space for shipping and storage when empty.

Still another object of the invention is to provide a selectively collapsible feeder which is suitable for the feeding of both small perching birds in addition to squirrels, jays and other more aggressive feeding wildlife species.

Yet another object of the invention is to provide a selectively collapsible feeder which includes a cone-shaped cover at its upper end which diverts rainwater outwardly and downwardly therefrom.

Still another object of the invention is to provide a selectively collapsible feeder for wild game which includes a perch ring at the lower end thereof.

Still another object of the invention is to provide a selectively collapsible feeder having a cone-shaped lower plate provided at its lower end which is perforated.

These and other objects will be obvious to those skilled in the art.

BRIEF DESCRIPTION OF THE DRAWINGS

FIG. 3 is a side view of the feeder;

FIG. 4 is a bottom view of the feeder;

DESCRIPTION OF THE PREFERRED EMBODIMENT

Figure 1:
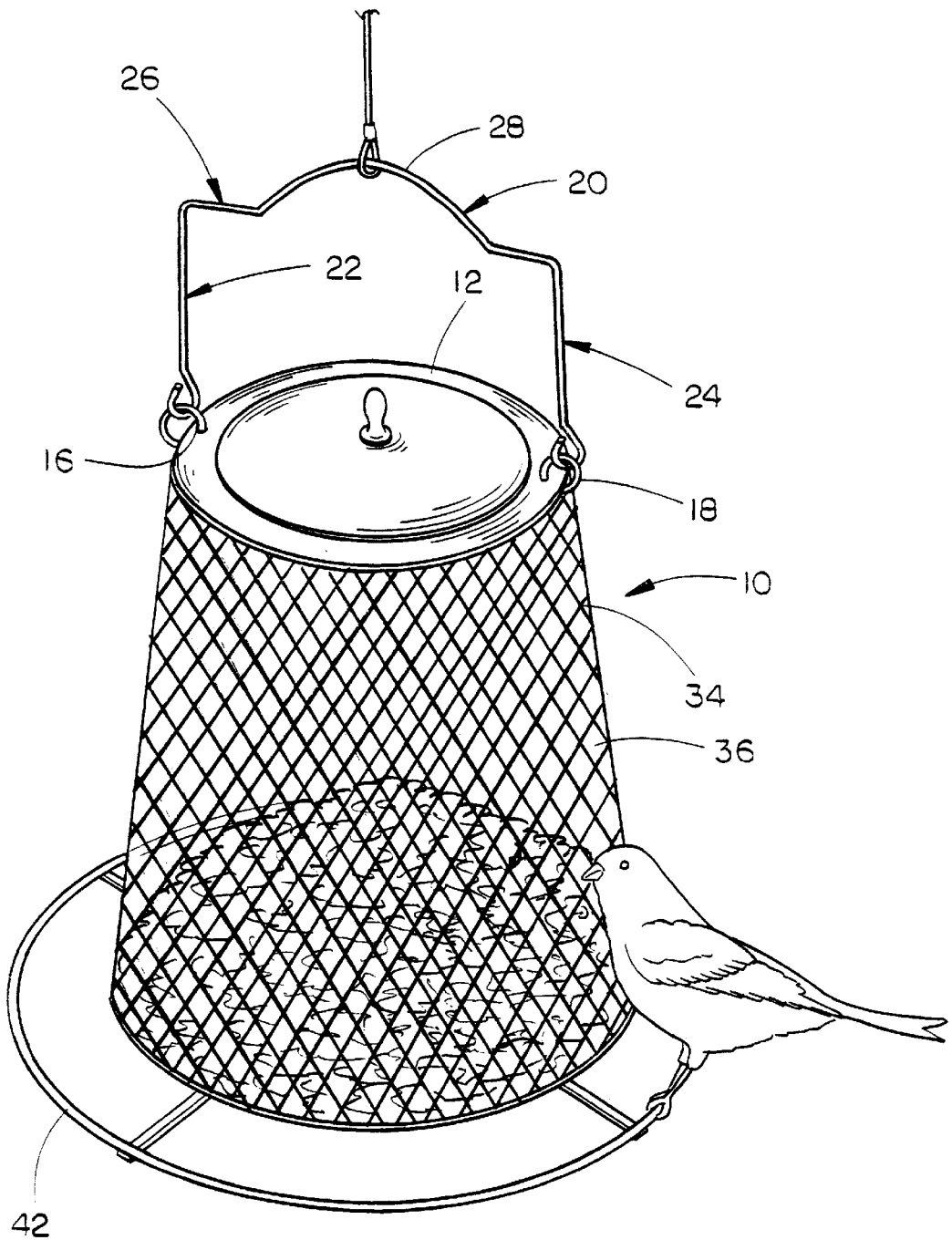
FIG. 1 is a perspective view of the collapsible feeder of this invention.

The collapsible feeder of this invention is referred to generally by the reference numeral 10. Feeder 10 includes disk-shaped upper support plate 12 having a central feed fill opening 14 formed therein. A pair of eyes or rings 16 and 18 are secured to support plate 12 at opposite sides thereof and have an inverted U-shaped hanger bracket 20 pivotally secured thereto. Bracket 20 includes legs 22 and 24 which are pivotally connected to the eyes 16 and 18, respectively, and a central leg 26 extending therebetween. As seen in the drawings, central leg portion 26 includes an arcuate portion 28 which is adapted to receive a hook, snap or other connector so that the feeder will hang vertically. The U-shaped hanger bracket 20 also serves as a handle for carrying the feeder to its desired location. The pivotal connection of the hanger bracket 20 with the eyes 16 and 18 enables the hanger bracket 20 to be folded flat for purposes of storage or shipment.

Cover 30 includes a knob 32 and selectively closes the central feed fill opening 14 and is secured therein by any convenient means. Cover 30 is slightly conical-shaped so that rainwater coming into contact with the cover 30 will be directed downwardly and outwardly therefrom.

Figure 2:
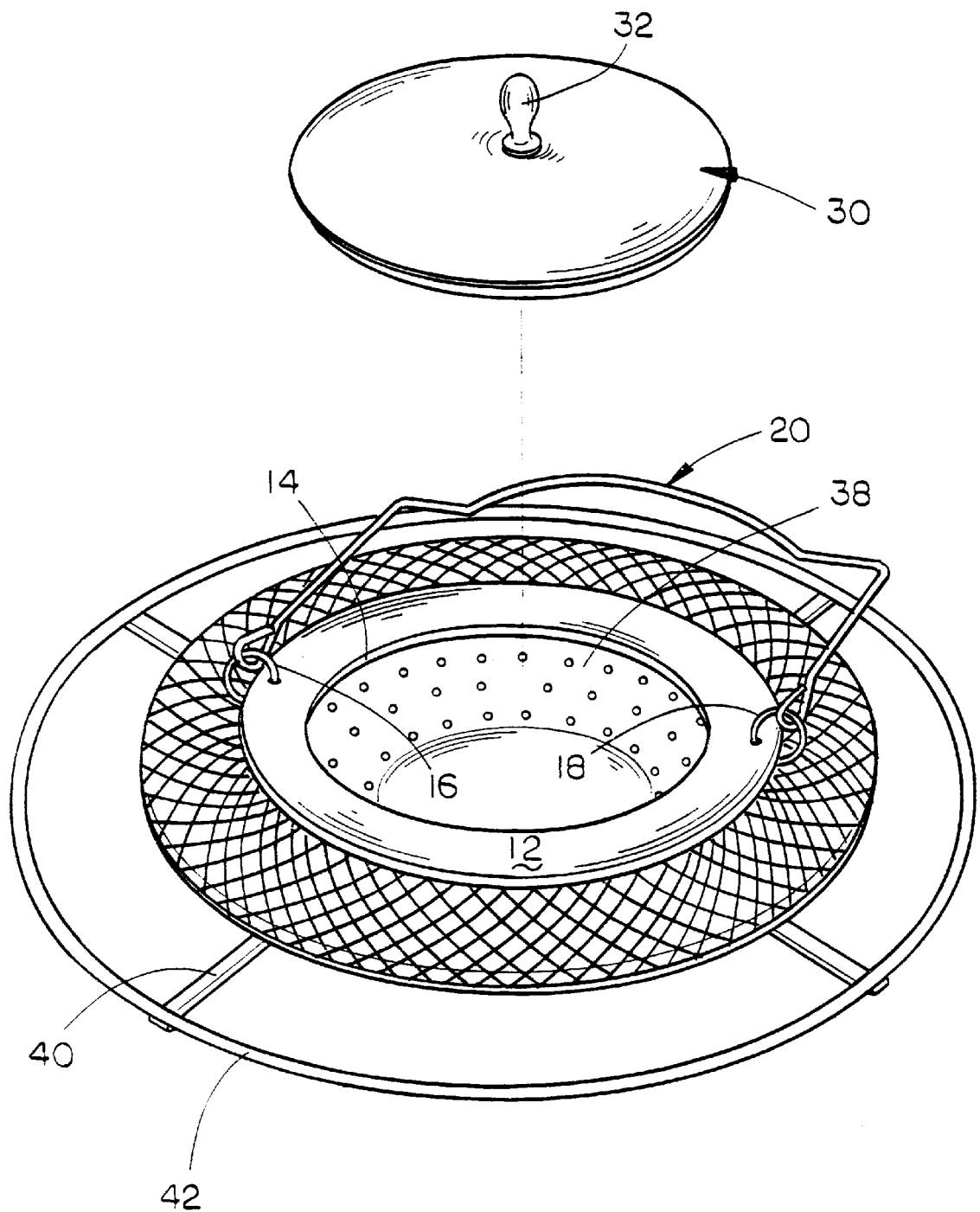
FIG. 2 is a view similar to FIG. 1 except that the feeder has been collapsed and the cover has been removed therefrom.

A metal mesh wall 34 is secured to the upper support plate 12 and extends downwardly and outwardly therefrom. The metal mesh wall 34 is of the type which permits it to be collapsed, as illustrated in FIG. 2, but which normally remains upright when in a standing position and which remains upright when in a hanging position. The metal mesh wall 34 has a plurality of diamond-shaped openings 36 preferably having a height of ¼" and a width of 3/16".

A lower support plate 38 is secured to the lower end of metal mesh wall 34 and is preferably conical-shaped, as illustrated in the drawings, to direct the feed in the feeder towards the outer edges thereof. Preferably, lower support plate 38 is perforated to enable water or moisture to drain from the feeder. In the preferred embodiment, a plurality of support rods 40 are secured to support plate 38 and extend horizontally outwardly therefrom. A perch ring 42 is secured to the outer ends of the support rods 40 in a spaced relationship with the metal mesh wall 34. Preferably, the perch ring 42 is spaced approximately two inches from the mesh wall 34.

Figure 5:
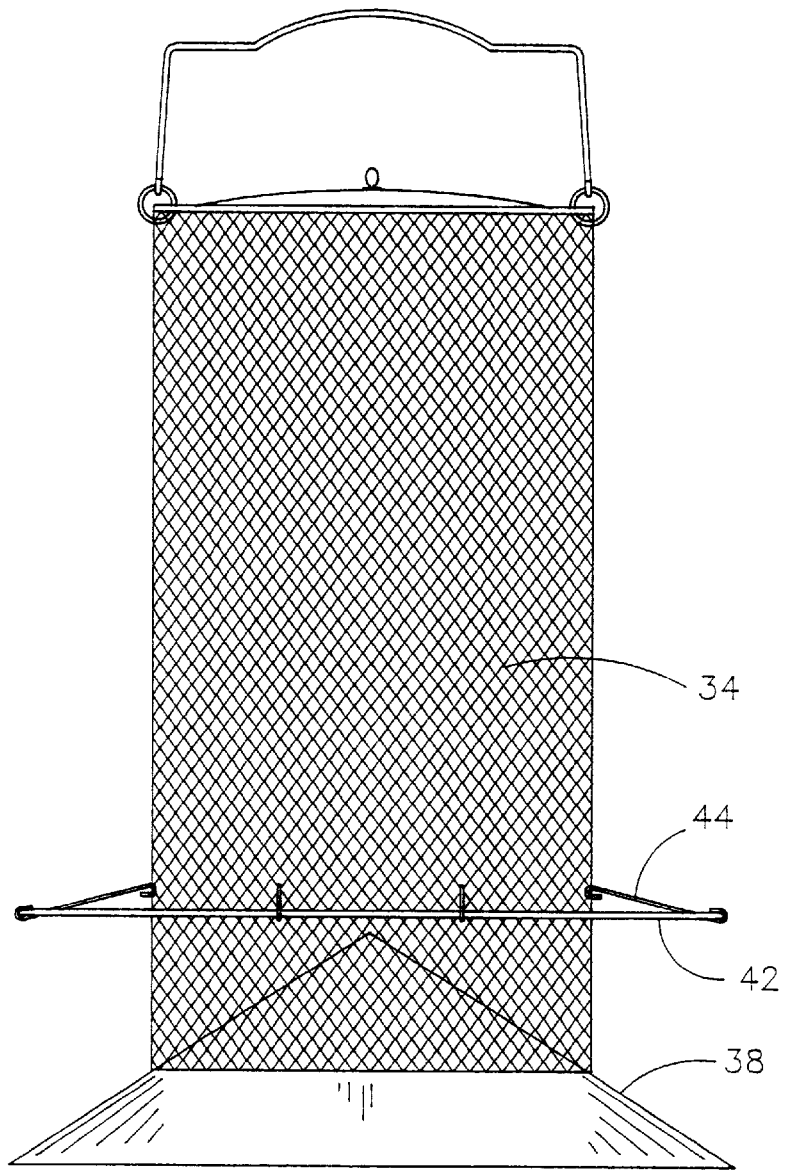
FIG. 5 is a side view of a modified form of the feeder.
Figure 6:
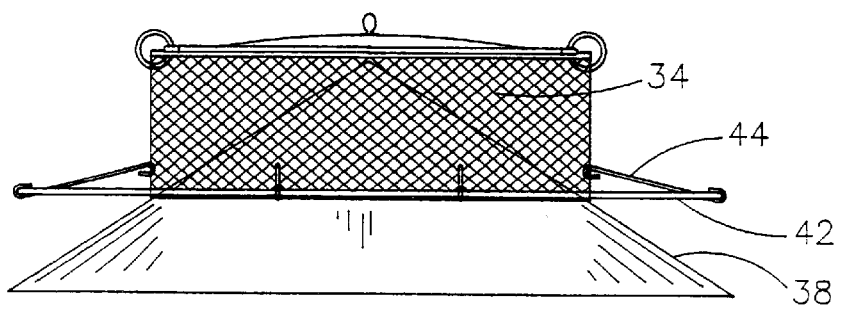
FIG. 6 is a side view of the feeder of FIG. 5 with the feeder in a collapsed position.

In another embodiment of the invention shown in FIGS. 5 and 6, the perch ring 42 is not supported by the support rods 40, but is supported by the mesh wall 34 itself by means of hooks 44. In the embodiment of FIGS. 5 and 6, the perch ring 42 may be eliminated, if desired, by shaping the lower support plate 38, as seen in FIGS. 5 and 6, so that the lower outer edge thereof extends approximately two inches outwardly and downwardly from the bottom of the mesh wall 34.

It can therefore be seen that a selectively collapsible feeder has been provided for wild game that is inexpensive and simple to construct, easy to install and use, capable of accepting a wide variety of wildlife foods, and is suitable for the feeding of both small perching birds and also squirrels, jays and other more aggressive feeding wildlife species. The feeder may be collapsed when empty so that it requires a minimum of space for shipping and storage.

Figure 7:
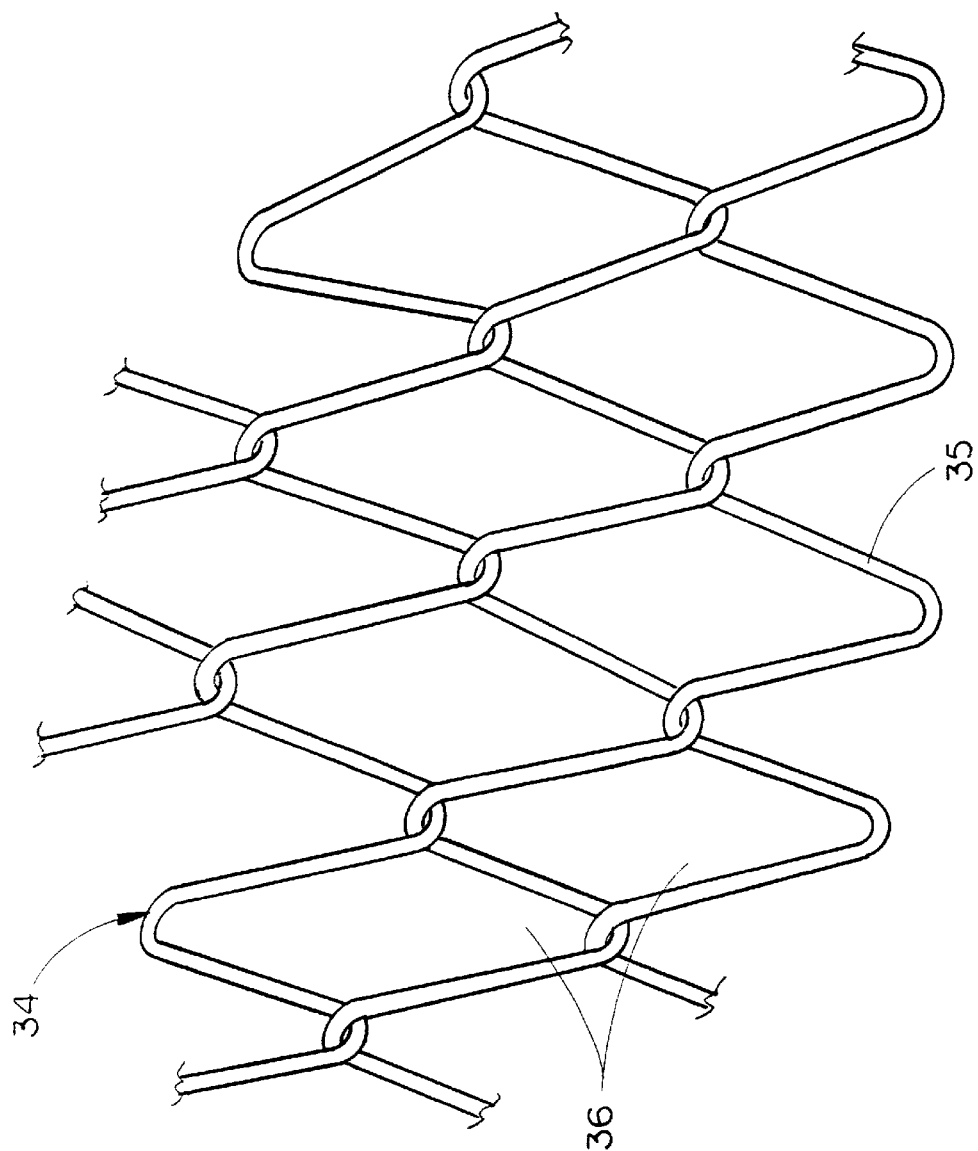
FIG. 7 is a fragmentary side view of the mesh wall of the feeder.

Although the mesh wall 34 is shown as being a truncated cone shape, which is the preferred embodiment, the mesh wall could have a cylindrical shape, as seen in FIGS. 5 and 6. FIG. 7 shows the relationship of the interwoven wires which permit the mesh wall to collapse.

Thus it can be seen that the invention accomplishes at least all of its stated objectives.

I claim:

1. A collapsible feeder for birds, squirrels and the like, comprising:

a disk-shaped support plate having a central feed fill opening;

a cover member selectively positioned on said support plate for selectively closing said central feed fill opening;

a truncated, conical-shaped, collapsible mesh wall, having upper and lower ends;

said upper end of said collapsible mesh wall being secured to said upper support plate and extending downwardly therefrom;

and a lower support plate secured to said collapsible mesh wall which extends across the lower end thereof.

2. The collapsible feeder of claim 1 wherein said cover is conical-shaped for directing outwardly and downwardly therefrom.

3. The collapsible feeder of claim 1 wherein said lower support plate is conical-shaped for directing feed outwardly and downwardly towards said mesh wall.

4. The collapsible feeder of claim 3 wherein said lower support plate is perforated.

5. The collapsible feeder of claim 1 wherein said mesh wall is comprised of a metal material.

6. The collapsible feeder of claim 4 wherein said mesh wall has diamond-shaped openings formed therein.

7. The collapsible feeder of claim 5 wherein each of said diamond-shaped openings has a width of approximately 3/16 inch and a height of approximately ¼ inch.

8. The collapsible feeder of claim 1 wherein said lower support plate is perforated.

9. The collapsible feeder of claim 1 wherein a ring is secured to said mesh wall.

10. The collapsible feeder of claim 9 wherein said perch ring is spaced outwardly of said mesh wall.

11. The collapsible feeder of claim 1 wherein a perch ring is secured to said lower support plate.

12. The collapsible feeder of claim 11 wherein said perch ring is spaced outwardly of said mesh wall.

13. The collapsible feeder of claim 1 wherein a plurality of support rods are secured to said lower support plate which extend outwardly therefrom and wherein a perch ring is secured to the outer ends of said support rods.

14. The collapsible feeder of claim 1 wherein said mesh wall is selectively collapsible.

15. The collapsible feeder of claim 1 wherein an inverted U-shaped support is selectively pivotally secured to said upper support plate.

16. The collapsible feeder of claim 15 wherein said inverted U-shaped support includes first and second legs having a third leg extending therebetween, said third leg having an arcuate portion formed therein.

17. A collapsible feeder for birds, squirrels and the like, comprising:

a ring-shaped support defining a central feed fill opening;

a cover member selectively positioned on said support for selectively closing said central feed fill opening;

a collapsible metal mesh wall, having upper and lower ends;

said upper end of said collapsible metal mesh wall being secured to said support and extending downwardly therefrom;

and a lower base secured to said collapsible metal mesh wall which extends across the lower end thereof;

said metal mesh wall comprising a plurality of horizontally disposed and substantially vertically spaced wire members, each of said wire members having alternating ridges and grooves formed therein which intermesh with the grooves and ridges, respectively, of an adjacent wire member to permit said mesh wall to collapse;

said wire members defining generally diamond-shaped openings therebetween which are large enough to permit birds, squirrels and the like to feed therethrough, but which are small enough to prevent birds, squirrels and the like from entering the interior of the feeder.

18. A collapsible feeder for birds, squirrels and the like, comprising:

a ring-shaped support defining a central feed fill opening;

a collapsible metal mesh wall, having upper and lower ends;

said upper end of said collapsible metal mesh wall being secured to said support and extending downwardly therefrom;

and a lower base secured to said collapsible metal mesh wall which extends across the lower end thereof;

said metal mesh wall comprising a plurality of horizontally disposed and substantially vertically spaced wire members, each of said wire members having alternating ridges and grooves formed therein which intermesh with the grooves and ridges, respectively, of an adjacent wire member to permit said mesh wall to collapse;

said wire members defining generally diamond-shaped openings therebetween which are large enough to permit birds, squirrels and the like to feed therethrough, but which are small enough to prevent birds, squirrels and the like from entering the interior of the feeder.

* * * * *